United States Patent [19]
Parks

[11] 3,732,760
[45] May 15, 1973

[54] TOOL HOLDER

[76] Inventor: Wesley E. Parks, P.O. Box 132, Loveland, Colo. 81537

[22] Filed: Feb. 10, 1971

[21] Appl. No.: 114,125

[52] U.S. Cl. ...................82/36 R, 82/35, 29/57, 408/150
[51] Int. Cl. .............................B23b 29/10
[58] Field of Search.............................82/36, 37, 35; 408/150, 151, 173, 180; 279/6; 29/57

[56] References Cited

UNITED STATES PATENTS

| | | | |
|---|---|---|---|
| 2,151,379 | 3/1939 | Flaker | 82/35 |
| 632,544 | 9/1899 | Warner et al | 82/35 |
| 3,296,904 | 1/1967 | Bullard | 82/36 |
| 1,483,190 | 2/1924 | Kaegi-Treulin | 279/6 |
| 2,821,402 | 1/1958 | Schober | 279/6 |
| 2,473,418 | 6/1949 | Fellroth | 82/35 |

FOREIGN PATENTS OR APPLICATIONS

| | | | |
|---|---|---|---|
| 413,597 | 5/1946 | Italy | 29/98 |

*Primary Examiner*—Leonidas Vlachos
*Attorney*—Anderson, Spangler & Wymore

[57] ABSTRACT

This invention relates to a tool holder for cutting tools and the like which includes a chuck piece fastenable into the chuck of a machine tool turret and a pair of interchangeable tool-carrying heads that are fastened to the chuck piece so that the tool can be adjusted in its position relative to the work piece. One of the tool-carrying heads holds an external cutting tool for essentially radial movement toward and away from the work piece while the other of said tool-carrying heads carries primarily a boring or inside cutting tool for generally axial movement parallel to the axis of rotation of the work piece. Both of the tool-carrying heads provide for three adjustments of the tool relative to the work piece, two of which are common and the other exclusive. Each includes a fine arcuate adjustment of the entire head relative to the chuck piece in a plane normal to the axis of rotation of the work piece and also a circular adjustment in this same plane by means of a rotatable eccentric pin selectively mountable in either of two positions in the head. The outside or turning tool head includes provision for coarse transverse straight-line adjustment of the tool toward and away from the work piece in a plane normal to the axis of rotation thereof; whereas, the inside or boring tool head contains means for moving the tool in a straight line longitudinally parallel to the tool rotation axis.

11 Claims, 9 Drawing Figures

PATENTED MAY 15 1973 3,732,760
SHEET 1 OF 2
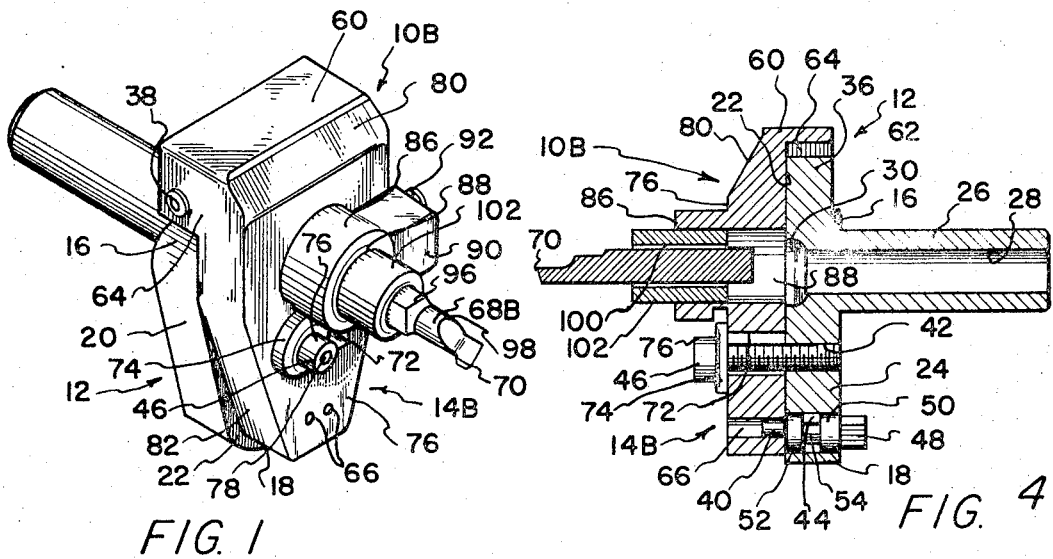
FIG. 1
FIG. 4
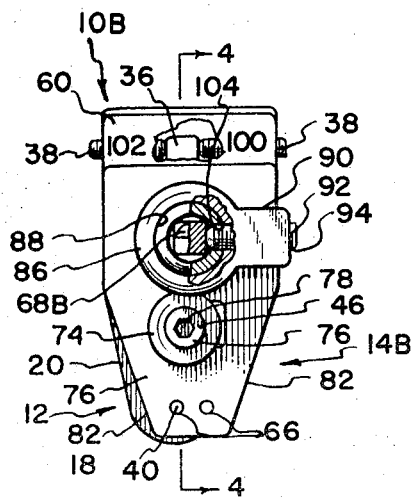
FIG. 3
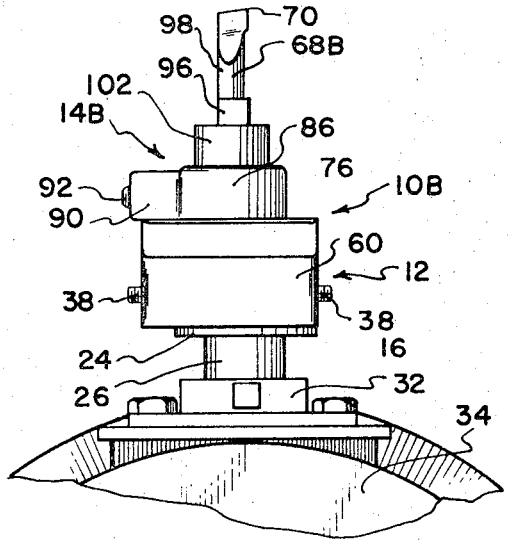
FIG. 2
INVENTOR
WESLEY E. PARKS
BY
ATTORNEYS

INVENTOR
WESLEY E. PARKS
ATTORNEYS

TOOL HOLDER

Automatic turret-type machine tools are well known in the art and they are most often used to perform a series of sequential turning and boring operations over and over again on many hundreds and even thousands of cylindrical work pieces, both solid and tubular. The turret containing several different cutting tools moves one into position against the work piece, performs a cutting operation thereon as it transverses toward the headstock automatically by means of a lead screw, returns to its original position and indexes to place a second tool in operative position. One by one each tool moves into operative position and performs its cutting function until the work piece is finished, at least so much thereof as is to be performed automatically on a turret type cutting machine.

The tool holder of the present invention is used to adjustably fasten the cutting tool into the turret so that critical changes may be made in the position of the tool relative to the work piece. Such adjustments are necessary both to set the tool in the proper position to start with and to compensate for tool wear. The work pieces are small anyway and they are machined to tolerances of a few ten-thousandths of an inch which means that reproducability becomes difficult to achieve and maintain.

For the most part, the present tool holders for use with turret-type machines provide for little, if any, fine adjustment of the tool relative to the work piece. In many instances, it is strictly a hit-or-miss proposition with the machinist giving the tool a tap toward the work piece hoping that it will end up where he wants it rather than the precise operation it should be. Such an operation only regulates the depth of the cut and leaves undone the equally important positioning of the cutting edge of the tool so as to engage the work piece precisely midway between the top and bottom thereof with the tool axis essentially horizontal in accordance with accepted machining practices. In other words, the prior art tool holders make no provision for fine adjustment of the tool up and down relative to the work piece.

It has now been found in accordance with the teaching of the instant invention that these and other shortcomings of the prior art tool holders for turret-type machine tools can, in large measure, be eliminated through the use of a unit that provides for both coarse and fine adjustments of the cutting tool relative to the work piece. A rotatable eccentric pin selectively positionable in either one of two different locations in one part of a two-part subassembly consisting of a chuck piece and tool head enables the cutting tool to be raised or lowered to precisely the proper position to engage the work piece at the exact point it must to produce an accurately machined surface in accordance with well known techniques. Next, a coarse straight-line transverse adjustment is made of the turning tool or a coarse longitudinal adjustment of the boring tool to position same relative to the work piece. Finally, a fine arcuate transverse adjustment of the tool is made by means of an opposed pair of set screws moving the head laterally relative to the chuck piece along a short arc defined by the eccentric pivot pin.

If the tool needs to be removed from the tool holder and examined, it can be returned to precisely its former position without altering the previously made adjustments. On the other hand, if the tool must be sharpened or replaced, such readjustment as must be made can be done easily and quickly and with a degree of precision heretofore unattainable with the prior art tool holders.

It is, therefore, the principal object of the present invention to provide a novel and improved tool holder for machine tool turrets.

A second objective is to provide a device of the type aforementioned that includes both fine and coarse adjustments of the tool relative to the work piece.

Another objective is the provision of a tool holder having interchangeable heads, one for external cutting tools exclusively and the other principally for boring tools.

Still another object of the invention herein disclosed and claimed is to provide a cutting tool holder that can be substituted for the tool holders on most of the commonly used turret-type machine tools without modification.

An additional objective is the provision of a holder for cutting tools that can be held in adjusted position so that the tool can be removed therefrom and reinserted without any readjustment being required.

Further objects are to provide an adjustable tool-carrying mechanism that is versatile, precision-made, easy to use, relatively inexpensive, rugged, compact, comparatively simple, accurate and even decorative in appearance.

Other objects will be in part apparent and in part pointed out specifically hereinafter in connection with the description of the drawings that follows, and in which:

FIG. 1 is a perspective view looking down and to the left upon the tool holder of the present invention, the chuck piece having been shown fitted with the boring tool head;

FIG. 2 is a top plan view of the tool holder of FIG. 1 showing the tubular neck of the chuck piece mounted in the chuck of a turret, only a fragment of the latter element having been illustrated;

FIG. 3 is a front elevation, portions of which have been broken away and shown in section to better reveal the interior construction;

FIG. 4 is a vertical section taken along line 4—4 of FIG. 3;

Figure 5:
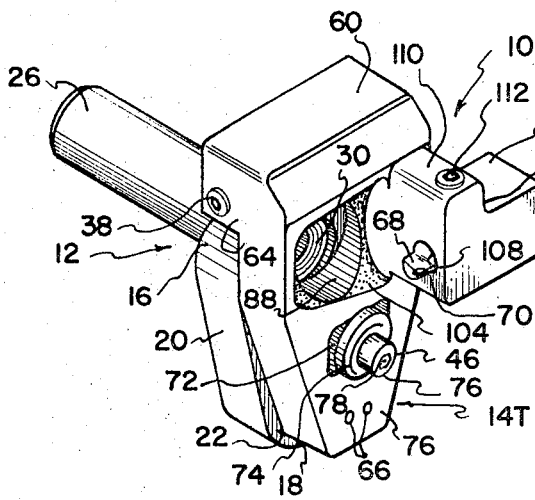
FIG. 5 is a perspective view similar to FIG. 1 except that the turning tool head has been substituted for the boring tool head on the chuck piece.
Figure 6:
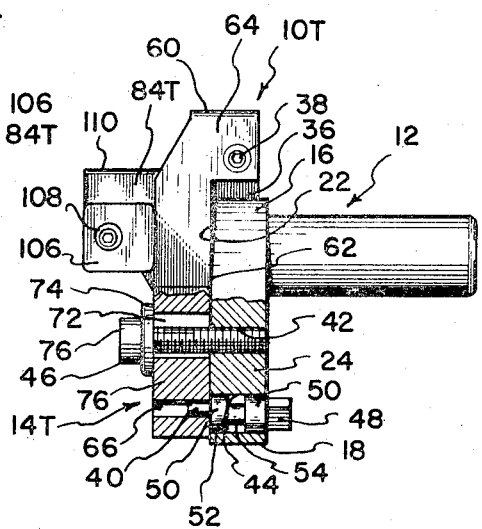
FIG. 6 is a side elevation of the tool holder of FIG. 5, portions thereof having been broken away and shown in section.

Referring next to the drawings for a detailed description of the present invention, reference numeral 10B has been selected to broadly designate the boring tool holder combination of FIGS. 1 - 4, inclusive, while reference numeral 10T has been employed to similarly denominate the turning tool holder combination of FIGS. 5 - 9. Both versions 10B and 10T of the tool holder include a common chuck piece that has been indicated in a general way by numeral 12 while they differ in that the boring tool version 10B has the boring tool head 14B attached thereto and the turning tool assembly 10T is equipped with the turning tool head 14T.

Having generally differentiated between the two combinations of the tool holder, reference will next be made to the several Figures of the drawing for a detailed description of the chuck piece 12, all of which reveal some features thereof. In the particular form shown, chuck piece 12 has convex semi-cylindrical top and bottom end walls 16 and 18, with the latter wall being of lesser diameter than the former. The side walls 20 are planar and upwardly divergent so as to merge tangentially with the different diameter end walls while cooperating therewith to define a unit having a generally egg-shaped elevation. The front and rear faces 22 and 24, respectively, are essentially planar and parallel to one another except that rear face 24 has an integrally formed tubular neck 26 projecting rearwardly therefrom in perpendicular relation. The axial bore 28 inside neck 26 emerges onto the front face of the chuck piece with a slight flair 30. Neck 26 is releasably fastened within the chuck 32 of conventional turret 34, a portion of which is revealed in FIG. 2.

Projecting radially from the upper end of the chuck piece 12 is an integrally formed ear 36 that has been shown centered midway between the extremities of the semi-cylindrical end wall 16. The ear defines a two-sided abutment against which the opposed set screws 38 of the tool heads 14 seat as they are rocked arcuately from side to side about eccentric pin 40 to move the tools 42 essentially radially toward and away from the work piece in a manner that will be described in considerable detail presently.

In substantially vertically aligned relation with the ear 36 and axis of bore 28 through tubular neck 26 are two other bored openings 42 and 44 whose axes parallel that of bore 28 and are, therefore, perpendicular to the front and rear faces 22 and 24. The upper of the two bores 42 is internally threaded to receive bolt 46 that fastens the chuck piece 12 and tool head 14 together in adjusted assembled relation. As shown, threaded bore 42 is located very near the geometrical center of the chuck piece.

The other bore 44 is located beneath threaded bore 42 near the bottom end of the chuck piece where the rear entry thereto is accessible beneath turret 34 so that a wrench can be applied to head 48 of adjusting member 50 that projects rearwardly therefrom. Bore 44 is smooth surfaced so that member 50 can rotate freely therein upon the application of torque to the projecting square head 48 thereof. The body 52 of adjusting element 50 is cylindrical and sized to turn within the bore with a free-sliding fit. Body 52 is encircled by an annular groove 54 intermediate the ends thereof. Set screw 56 threaded into intersecting bore 58 in the side of the chuck piece (FIG. 8) enters the annular groove 54 and holds the adjusting element 50 against relative axial movement within bore 44 while permitting free rotational movement thereof.

Next, the common structural features of both tool heads 14B and 14T will be delineated before proceeding with a detailed look at their differences. Both tool heads are somewhat larger than the chuck piece 12 to which they are attached, especially at the top thereof where an integrally formed crown 60 projects rearwardly out over the top of ear 36 from the planar rear face 62 that mates with the front chuck piece face 22. The extremities of the crown 60 define integrally formed downturned ears 64 that embrace ear 36 of the chuck piece in transversely spaced relation thereto as is most clearly revealed in FIG. 8. The opposed pair of set screws 38 are threaded through these ears 64 so as to project inward transversely in axially aligned relation to one another. The adjacent ends of these set screws engage opposite sides of ear 36 as shown and cooperate therewith and with eccentric pivot pin 40 journalled within one of the sockets 66 of the head member to produce a fine arcuate adjustment of the tool 68 toward and away from the surface of the work piece. Transverse adjustments of up to one-half inch or so can be made in this manner.

Figure 7:
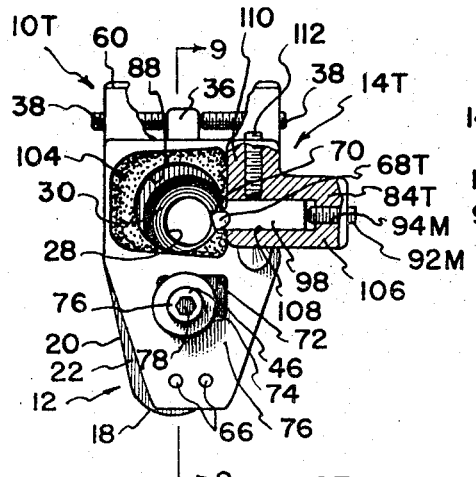
FIG. 7 is a front elevation similar to FIG. 3, again with portions broken away and shown in section.
Figure 8:
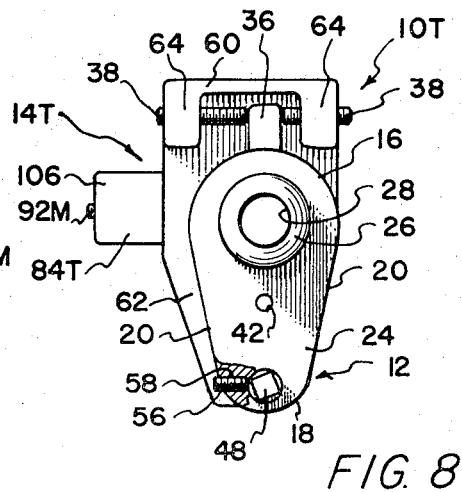
FIG. 8 is a rear elevation with portions broken away and sectional.
Figure 9:
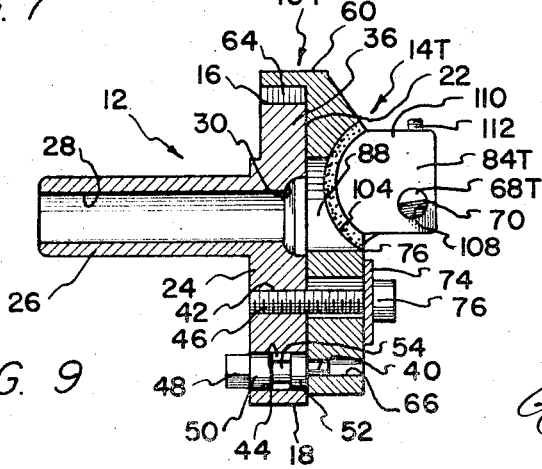
FIG. 9 is a vertical section similar to FIG. 4 taken along line 9—9 of FIG. 7.

A transversely spaced pair of parallel pin-receiving sockets have been shown in the face of the heads 14 located near the bottom thereof in position to receive eccentric pin 40 of the adjustment member 50. Obviously, as member 50 is rotated within its bore 44, eccentric pin 40 journalled within one of the sockets 66 will cause the lower end of the head to describe a circular loop defined by the eccentric axis of said pin thereby relocating the cutting edge 70 of the tool relative to the work piece. Since adequate provision is made for adjusting the tool horizontally toward and away from the work piece in the form of both coarse and fine transverse adjustments, adjustment member 50 and the eccentric pin 40 carried on the outer end thereof are primarily employed to raise and lower the cutting edge 70 of the tool so as to contact the turned surface of the work piece tangentially at a point exactly midway between the top and bottom thereof in accordance with the best machining practices and techniques. The two sockets 66 shown are to be used selectively to place the tool in proper position against the work piece, the main factor influencing this decision being the diameter of the latter. These two sockets as can be seen most clearly in FIGS. 3 and 7 are offset transversely on opposite sides of the vertical centerline of the head and one is even shown displaced farther therefrom than the other. As thus located, pin 40 would be positioned in the left-hand socket 66 as viewed in FIG. 7 when turning a small diameter on a work piece; whereas, conversely, it would be relocated in the right-hand socket when turning a large diameter one as, in each case, the tool would remain with its longitudinal axis substantially horizontal rather than tilted up or down.

The large rectangular opening 72 in the center of the tool-carrying heads 14 opens onto threaded bore 42 in the chuck piece in all adjusted positions of the former element relative to the latter. A washer 74 beneath the shoulder provided by the head 76 of bolt 42 engages the planar front face 76 of the tool heads and draws the rear face 62 of the latter up snug against the front face 22 of the chuck piece. The bolt head is shown provided with a hexagonal socket 78 in the end thereof adapted to accept an Allen wrench.

The front upper corner of the crown 60 is truncated as shown to provide inclined surface 80 in front of the set screws 38. The lower right and left-hand corners are, likewise, cut on a bias as shown at 82 for the sole purpose of removing the excess material therefrom. Neither of the aforementioned features of the tool-carrying heads have any functional significance, however. The remaining features of the tool-carrying heads all relate to the integrally formed tool bosses 84B and 84T projecting from the front faces thereof that constitute the primary structural and functional differences between the boring and turning heads 14B and 14T, respectively.

Accordingly, reference will now be made to FIGS. 1 - 4, inclusive, for a description of tool boss 84B of the tool holder 10B. This boss is relatively simple and includes a short tubular projection 86 centered midway between the side margins of the front face 76. An axial bore 88 of substantial diameter extends all the way through the head and emerges on the rear face 62 thereof. An integral enlargement 90 projects from one side of the tubular projection 86 and mounts a set screw 92 within an intersecting internally threaded opening 94 (FIG. 3). Set screw 92 engages one of the flats 96 on the shank 98 of the tool 68B and forces it tightly against the opposite wall of the bore 88 or, alternatively, the opening 100 in bushing 102. The latter bushing fits snugly into tubular projection 86 and reduces the diameter of bore 88 so as to accept tools 68B with small shanks 98. Tools with larger shanks than that shown will be secured directly in the bore 88. The bushing, of course, includes an opening 104 (FIG. 3) in the wall thereof that can be aligned with threaded opening 94 to pass the set screw. The tool 68B can, of course, be adjusted axially by merely sliding it forward and back within the tubular projection or bushing. Once adjusted axially, it can be adjusted from side to side by means of set screws 38 and vertically by means of eccentric pin 40. Actually, set screws 38 would be loosened along with screw 46 so that the head 14B could be rocked from side to side to place the cutting edge 70 of the tool 68B against the surface of the work piece. Next, adjustment member 50 would be rotated to raise or lower the cutting edge 90 to the proper height alongside the work piece; whereupon, the set screws 38 would be tightened against the ear 36 therebetween. Finally, screw 46 would be tightened to hold the units thus adjusted in assembled relation.

Looking next to FIGS. 5 - 9, inclusive, it will be seen that the boss 84T for the turning tool head 14T has the tubular projection 86 of the boring tool head replaced by a shallow cavity or recess 104 that merges into bore 88. This recess receives the work piece as the tool 68T moves forwardly along the external surface thereof.

The boss has a generally L-shaped configuration when looking toward the front thereof as in FIGS. 5 and 7. The horizontal leg 106 has a transversely extending cylindrical tool socket 108 therein adapted to receive the shank 98 of tool 68T. Coaxially aligned with this socket is the internally threaded opening 94M for the smaller set screw 92M that engages the end of the tool and adjusts it transversely toward and away from the work piece along a line normal to its axis of rotation. Set screw 92M of the turning tool head 14T, therefore, constitutes the coarse adjustment feature for transverse adjustment of the tool relative to the work piece while opposed set screws 38 constitute the fine adjustment therefor in the same transverse mode. The vertically extending leg 110 of the boss 84T includes a vertical internally threaded opening 112 that intersects socket 108 and carries set screw 112. The latter set screw engages the shank 98 of the cutting tool 68T and holds it against rotation within the tool socket as well as axial movement away from set screw 92M.

In order to adjust tool 68T relative to the work piece, screws 38 are backed away from ear 36 of the chuck piece thus permitting the tool head 14T to be rocked from side to side relative to the latter. The extent to which the cutting edge 70 of the tool 68T projects beyond the inner end of its socket 108 will, in all probability, have already been set by coarse adjustment set screw 92M but, if not, this operation should be performed in advance of any fine adjustment. Eccentric pin 40 is then placed in the appropriate socket 66 and the adjustment member 50 rotated until the cutting edge 70 engages the work piece at the proper point. Then, with the cutting edge held against the surface of the work piece, the set screws 38 are run up snug against ear 36 to complete the fine transverse adjustment of the cutting edge relative to the work piece. Actually, set screws 38 are used to determine the depth of cut in both versions of the tool holder as they provide the greatest degree of precision available in the assembly once the cutting edge has been adjusted to the proper height on the work piece surface.

What is claimed is:

1. A tool holder for mounting a cutting tool in the turret of a turret-type machine tool for adjustable movement relative to a rotating work piece which comprises: a chuck piece having a substantially planar front face containing a first cylindrical opening with its axis normal thereto and a stem projecting rearwardly from the rear face thereof in perpendicular relation to said front face mountable in the chuck of a machine tool turret; a tool head having a substantially planar rear face containing a second cylindrical opening with its axis normal thereto and mounting means on its front face adapted to releasably mount a cutting tool; eccentric pin means interconnecting the chuck piece and tool head together in face-to-face relation for relative circular movement in the plane of their parallel mating faces, said pin means including a first cylindrical section mounted for rotation in the first cylindrical opening and a second cylindrical section with its axis in offset parallel relation to the first mounted for rotation in the second cylindrical opening; and, clamp means interconnecting said chuck piece and tool head operative upon actuation to hold same in adjusted face-to-face relation.

2. A tool holder for mounting a cutting tool in the turret of a turret-type machine tool for adjustable movement relative to a rotating work piece which comprises: a chuck piece having a substantially planar front face containing a first cylindrical opening with its axis normal thereto and a stem projecting rearwardly from the rear face thereof in perpendicular relation to said front face mountable in the chuck of a machine tool turret; a tool head having a substantially planar rear face containing a second cylindrical opening with its axis normal thereto and mounting means on its front face adapted to releasably mount a cutting tool; first adjustment means interconnecting the chuck piece and tool head together in face-to-face relation for relative movement circular movement in the plane of their parallel mating faces, said means comprising a pin with a first cylindrical section mounted for rotation within the first cylindrical opening and a second cylindrical section with its axis in offset parallel relation to the first mounted for rotation in the second cylindrical opening; second adjustment means interconnecting the chuck piece and tool head together for relative pivotal movement about the offset axes defined by the first adjustment means, said means comprising a projection depending from one of said chuck piece and tool head elements movable therewith within a gap defined between spaced abutments in the other, and screw means threaded in said abutments in the other, and screw means threaded in said abutments operative upon actuation to bear upon said projection and maintain its adjusted position relative to the latter; and, clamp means interconnecting the chuck piece and tool head operative upon actuation to hold same in adjusted position.

3. The adjustable tool holder as set forth in claim 1 in which: one of said chuck piece and tool head elements includes an internally threaded transverse bore intersecting the cylindrical opening contained therein; the pin section journalled for rotation within said opening includes an annular groove aligned with the transverse bore; and, in which a set screw is threaded into said bore adapted to enter the annular groove and prevent relative longitudinal movement of the pin means while permitting free rotational movement thereof.

4. The adjustable tool holder as set forth in claim 1 in which: the clamp means comprises a large opening through one of said chuck piece and tool head elements, a smaller internally threaded bore in the other of said chuck piece and tool head elements positioned to register with said large opening in all adjusted relationships therebetween, a centrally apertured washer sized to bridge opposite margins of the large opening in all positions where said central aperture is aligned with the internally threaded bore, and a screw fastener passing through the central aperture in the washer into the internally threaded bore, said elements cooperating upon tightening of the screw fastener to draw the chuck piece and tool head elements together by forcing the washer against the exposed surface of the element carrying the large opening.

5. The adjustable tool holder as set forth in claim 1 in which: the mounting means comprises an integral boss projecting forwardly from the front face offset to one side of the work piece, said boss containing a socket adapted to receive the shank of a cutting tool and position same with its axis in a plane normal to the plane of the work piece axis, means threaded into the end of the socket remote from the work piece adapted to engage the adjacent end of the cutting tool shank and adjust same longitudinally of said socket, and set screw means intersecting said socket positioned and adapted upon actuation to engage said cutting tool shank and hold same in adjusted position.

6. The adjustable tool holder as set forth in claim 1 in which: the clamp means comprises an integral boss projecting forwardly from the front face offset to one side of the work piece, said boss containing a socket adapted to receive the shank of a cutting tool and position same with its axis in spaced parallel relation to the work piece axis, and set screw means intersecting said socket positioned and adapted upon actuation to engage said cutting tool shank and hold same in longitudinally adjusted position therein.

7. The adjustable tool holder as set forth in claim 1 in which: a portion of the eccentric pin means projects beyond one of the exposed surfaces of the chuck piece and tool head elements, said projecting portion being shaped to accept a wrench-type tool used for rotating same.

8. The adjustable tool holder as set forth in claim 2 in which: the projection compresses a single ear rising from the top of the chuck piece and the spaced abutments extend rearwardly from the upper corners of the tool head in bracketing relation to said ear.

9. The adjustable tool holder as set forth in claim 3 in which: the internally threaded transverse bore intersects the first cylindrical opening; and, in which the first cylindrical section of the eccentric pin means carries the annular groove.

10. The adjustable tool holder as set forth in claim 4 in which: the large opening is located in the tool head; and, in which the smaller internally threaded opening is located in the chuck piece.

11. The adjustable tool holder as set forth in claim 7 in which: the wrench-engaging projection of the eccentric pin means comprises an extension of the first cylindrical section thereof.

* * * * *